April 30, 1929.  R. C. WADE  1,711,369
MOLD FOR CASTING FISHING LINE SINKERS
Filed June 25, 1927
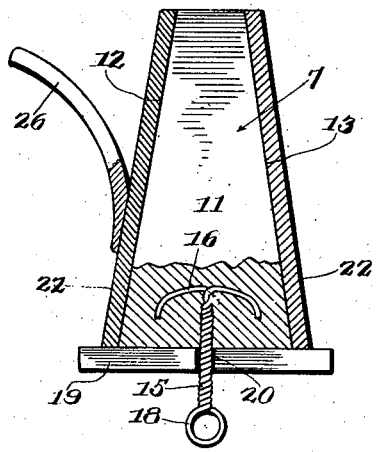
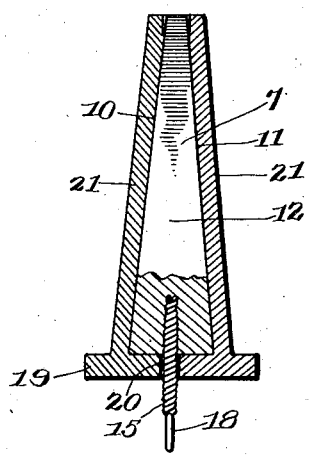
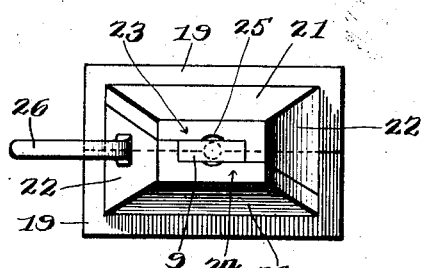
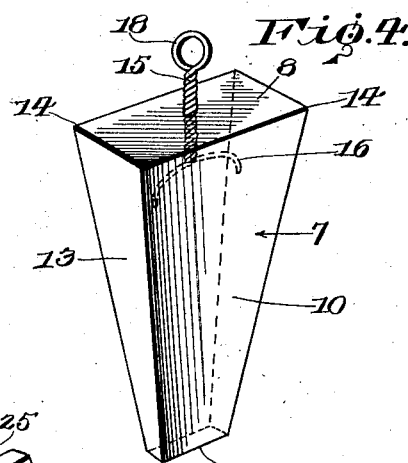
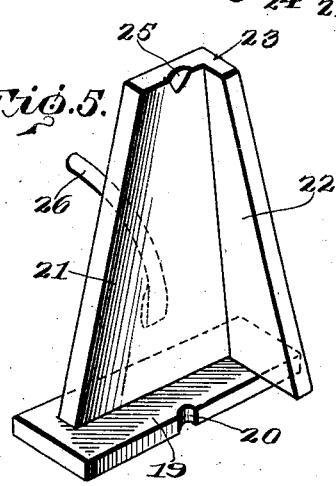
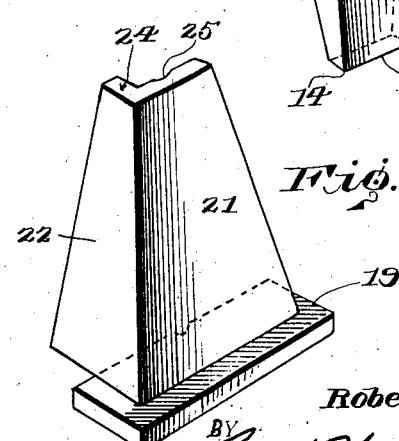
INVENTOR.
Robert C. Wade,
BY Geo. P. Kimmel
ATTORNEY.

Patented Apr. 30, 1929.

1,711,369

UNITED STATES PATENT OFFICE.

ROBERT C. WADE, OF BROWNSVILLE, TEXAS.

MOLD FOR CASTING FISHING-LINE SINKERS.

Application filed June 25, 1927. Serial No. 201,451.

This invention relates to a fishing line sinker and mold for making the same, and has for its object to provide, in a manner as hereinafter set forth, a mold for casting a sinker for lying flat upon the bottom of the body of water on which the line is cast whereby the sinker will remain where it is placed.

A further object of the invention is to provide, in a manner as hereinafter set forth, a mold for casting a sinker for fishing lines constructed in a manner as to cause it to lay flat upon the bottom of the body of water on which the line is cast, and especially when being used for surf fishing, to prevent the sinker to roll or move about such bottom, under such conditions remaining where it is placed.

A further object of the invention is to provide, in a manner as hereinafter set forth, a mold for casting a fishing line sinker having that end, in which the coupling loop is placed in the center thereof, larger than the other end, whereby when the line is being pulled in, the edge of the sinker digs into the sand and keeps the line taut, while if the sinker should strike a fixed object, such as a stone or snag, by reason of the shape of the sinker, the outer end will tip up and permit the inner or larger end to slip over the obstruction.

A further object of the invention is to provide, in a manner as hereinafter set forth, a mold for casting a fishing line sinker or weight, constructed in a manner whereby the several corners thereof are all sharp, acute angles, which gives the sinker or weight advantage over other weights on the market, for surf fishing, in that the sharp edges will cut into the sand bottom and hold its place or position, and prevent the sinker from rolling with the action of the water.

A further object of the invention, is to provide in a manner as hereinafter set forth, a mold for producing sinkers or weights from two to seven ounces each, and thereby meet the demands of various classes of fishing.

Further objects of the invention are to provide, in a manner as hereinafter set forth, a mold for casting fishing line sinker or weight, which is simple in its construction and arrangement, strong, durable, compact, readily made, thoroughly efficient in its use, and comparatively inexpensive to manufacture.

With the foregoing and other objects in view the invention consists of the novel construction, combination and arrangement of parts, as hereinafter more specifically described, and illustrated in the accompanying drawings, wherein is shown an embodiment of the invention, but it is to be understood that changes, variations and modifications can be resorted to which fall within the scope of the claim hereunto appended.

Referring to the drawing in detail wherein like reference characters indicate corresponding parts throughout the several views:

Figure 1 is a sectional view of a mold and a weight or sinker molded thereby, in accordance with this invention.

Figure 2 is a view similar to Figure 1, but taken at right angles thereto.

Figure 3 is a top plan view of a mold and a sinker or weight molded thereby, in accordance with this invention.

Figure 4 is a perspective view of a sinker or weight in accordance with this invention.

Figure 5 is a perspective view of one of the mold sections.

Figure 6 is a perspective view of the other mold section.

With reference to Figure 4, the sinker or weight referred to generally by the reference character 7 consists of a solid metallic body portion, preferably constructed of lead, and gradually increasing in cross sectional length and width from its outer toward its inner end.

The inner end of the sinker or weight, indicated at 8 is of rectangular contour and its outer end indicated at 9 is also of rectangular contour. The length and width of the end 8 is materially greater than the length and width of the end 9 and the latter is disposed concentrically with respect to the former. The end 8 as well as the end 9 is flat.

With reference to Figures 1 to 4, the sides of the sinker or weight are indicated at 10, 11, 12 and 13. The sides 10 and 11 are of greater width throughout than the sides 12 and 13. The sides 10, 11, 12 and 13 gradually decreases in width from the end 8 to the end 9. The sides incline inwardly from the end 8 to the end 9.

The length and width of the weight or sinker 7, in cross section, gradually increases from the end 9 to the end 8. The corners of the sinker or weight 7 and which are indicated at 14 are all sharp, acute angles, thereby providing sharp edges which will cut into the sand bottom and hold the sinker or weight in position and also prevent it from rolling with the action of the water.

Embedded in the larger end of the sinker or weight 7, as well as projecting from such end, centrally thereof, is a coupling member 15, formed of a length of twisted wire providing at the inner end of the member 15, anchoring extension 16 and at the outer end a loop 18 for connection with the fishing line.

The sinker or weight 7 consists of a tapered body, of rectangular cross section from end to end, having smooth uninterrupted sides and further having projecting from its larger or inner end a coupling member for connection to the fishing line.

With reference to Figures 1 to 3 and 5 and 6, there is disclosed a mold construction for producing the shape of sinker or weight referred to in various sizes, by way of example from two to seven ounces each, thereby meeting the demands of various classes of fishing. The mold consists of a pair of oppositely disposed sections and as both sections are of like construction, but one will be described, as the description of one will apply to the other. Each mold section comprises a rectangular base plate 19 having its inner edge formed centrally with a semi-circular notch 20. Formed integral with the base plate 19 is an upwardly extending and inwardly inclined, tapered wall forming member 21 having its bottom disposed lengthwise of the base plate 19 at a point between the longitudinal median and the outer side edge of the latter and further with its ends spaced from the end edges of the base plate 19. Formed integral with the wall member 21 and disposed at right angles with respect thereto, as well as extending inwardly therefrom, is a vertically disposed wall forming member 22 of the same height as the height of the member 21. The member 22 is disposed at an upward inward inclination and is of tapered contour. The outer face of the member 22 is flush with one side edge of the member 21. The members 21 and 22 are of appropriate thickness, but the width of the member 22 throughout is materially less than the width of the member 21. The bottom of the member 22 is integral with the plate 19 and is arranged between the transverse median of the latter and an end edge thereof. The bottom of the member 22 projects from the inner side edge of the base plate 19. One of the mold sections is indicated generally at 23 and the other mold section is indicated generally at 24. When the sections 23 and 24 are in closed position to form the molding chamber or cavity, the latter is of pyramidal contour so that the sinker or weight when molded will be of like contour. When the sections 23 and 24 are arranged in closed position the free side edge of the member 21 of the section 24 abuts against the inner face of the member 22 of the section 23 and the free side edge of the member 22 of the section 24 abuts against the inner face of the member 21 of the section 23. The outer face of the member 23 of the section 24 is flush with the free side edge of the member 21 of the section 23 and the outer face of the section 22 of the member 23 is flush with the free side edge of the member 21 of the section 24 when the mold sections are in closed position. When the sections 23 and 24 are in closed position, the base plates 19 abut, the notches 20 register and provide a circular opening for the passage of the stem of the coupling member 15. The inner face of the member 21, of each mold section, centrally of its upper end is notched as at 25. One or both sections of the mold can be provided with a handle member and as illustrated the section 23 has secured to its member 21 a handle member 26. The base plate 19 of the section 23 supports the lower end of the member 22 of the section 24 and the base plate 19 of the section 24 supports the lower end of the member 22 of the section 23 when the mold sections are positioned to form the molding cavity or chamber. Any suitable means can be employed for detachably connecting the sections of the molds together when it is desired to mold the sinker or weight. The sections of the molds are constructed of suitable metallic material, preferably steel.

It is thought the many advantages of a sinker or weight for fishing line, in accordance with this invention, can be readily understood, and although the preferred embodiment of the invention is as illustrated and described, yet it is to be understood that changes in the details of construction can be had which fall within the scope of the invention as claimed.

What I claim is:

A mold for fishing line sinkers comprising a body portion formed of a pair of oppositely disposed detachable sections, each of said sections including a base plate having its inner edge formed with a notch, and a pair of upstanding inwardly inclined wall forming members arranged adjacent the ends and outer side edges of the plate, one of said members disposed at an angle with respect to the other and projecting beyond the inner side edge of the plate, each of said members gradually decreasing in width upwardly, and said sections when in abutting relation providing a pyramidal shaped molding cavity or chamber having its bottom provided with an opening.

In testimony whereof, I affix my signature hereto.

ROBERT C. WADE.